United States Patent [19]
Miller et al.

[11] Patent Number: 5,146,324
[45] Date of Patent: Sep. 8, 1992

[54] DATA COMPRESSION USING A FEEDFORWARD QUANTIZATION ESTIMATOR

[75] Inventors: Sidney D. Miller, Mt. View; Peter Smidth, Menlo Park; Charles H. Coleman, Redwood City, all of Calif.

[73] Assignee: Ampex Corporation, Redwood City, Calif.

[21] Appl. No.: 560,606

[22] Filed: Jul. 31, 1990

[51] Int. Cl.$^5$ .............................. H04N 7/12
[52] U.S. Cl. ..................... 358/133; 358/12; 375/122
[58] Field of Search ............ 358/135, 133, 12; 375/122

[56] References Cited

U.S. PATENT DOCUMENTS

| | | |
|---|---|---|
| 4,025,950 | 5/1977 | Matsumoto et al. |
| 4,068,258 | 1/1978 | Bied-Charreton et al. |
| 4,175,270 | 11/1979 | Zenzefilis |
| 4,204,227 | 5/1980 | Gurley |
| 4,302,775 | 11/1981 | Widergren et al. |
| 4,394,774 | 7/1983 | Widergren et al. |
| 4,494,144 | 1/1985 | Brown |
| 4,541,012 | 9/1985 | Tescher |
| 4,580,134 | 4/1986 | Campbell et al. |
| 4,626,829 | 12/1986 | Hauck |
| 4,677,479 | 6/1987 | Hatori et al. ................ 358/133 X |
| 4,682,248 | 7/1987 | Schwartz |
| 4,724,535 | 2/1988 | Ono ............................. 375/122 |
| 4,734,767 | 3/1988 | Kaneko et al. ................ 358/133 |
| 4,740,832 | 4/1988 | Sprague et al. |
| 4,764,805 | 8/1988 | Rabbani et al. |
| 4,768,082 | 8/1988 | Hiratuska et al. |
| 4,774,562 | 9/1988 | Chen et al. |
| 4,783,841 | 11/1988 | Crayson |
| 4,797,741 | 1/1989 | Sato et al. |
| 4,849,807 | 7/1989 | Music et al. |
| 4,862,167 | 8/1989 | Copeland, III |
| 4,933,763 | 6/1990 | Chantelon .................. 375/122 X |
| 5,016,010 | 5/1991 | Sugiyama .................. 375/122 X |

OTHER PUBLICATIONS

Scene Adaptive Coder, Wen-Hsiung Chen/ Wm. K. Pratt, 1988 IEEE pp. 225-232.
An Experimental Study For A home Use Digital VTR, IEEE Transactions on Consumer Electronics, vol. 35. No. 3, Aug. 1989.
Spatial Transform Coding of Color Images, Wm. Pratt, IEEE Transactions on Communication Technology, vol. Com-19, No. 6, Dec. 1971.

Primary Examiner—Victor R. Kostak
Attorney, Agent, or Firm—George B. Almeida

[57] ABSTRACT

An image data compression technique is described which utilizes calculating means and a selected series of bit calculating stages having delays, to estimate one or more quantization parameters for such data. The estimation process preferably is iterated a number of times, with the values found through each estimation being used as the trial values for subsequent estimations. In addition, an initial trial value is selected by a data look ahead technique, which assures that its value is within range of the final quantization parameter used to quantize the data. The final quantization parameter insures that the compressed data fits within a predetermined number of encoded data bits to be transmitted or recorded, for example, in a recording medium.

16 Claims, 4 Drawing Sheets

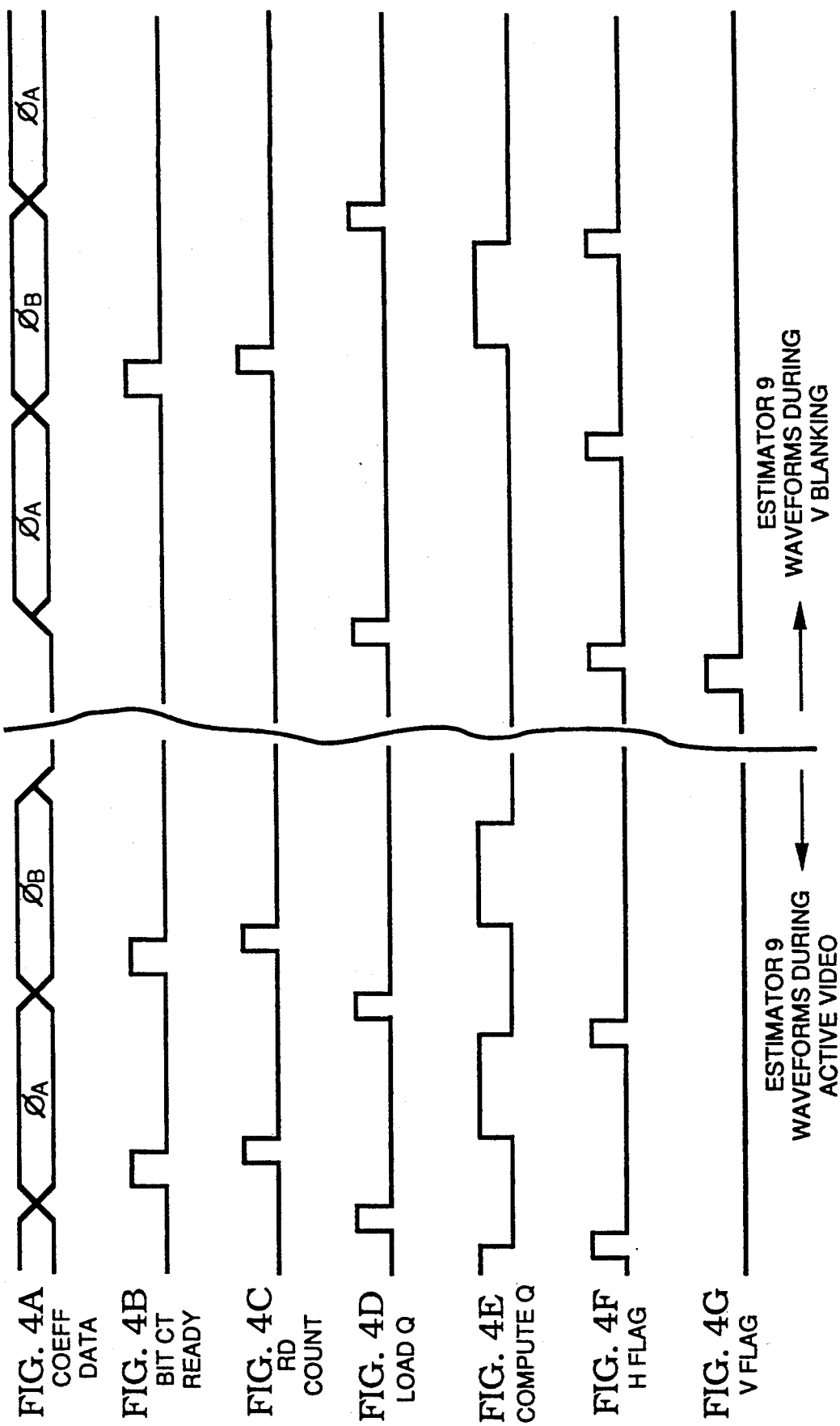

DATA COMPRESSION USING A FEEDFORWARD QUANTIZATION ESTIMATOR

BACKGROUND OF THE INVENTION

1. Field of the Invention

This invention relates to adaptive coding and to the real-time compression of digital signals suitable for the transmission through a communications channel or for recording and playback on a magnetic tape recorder or other recording medium. More particularly, the present invention relates to a feedforward technique for estimating a variable quantization parameter so that when recorded, the amount of compressed data can be stored in the space allotted on the recording medium.

2. Description of Prior Art

In general, the goal of data compression is to send digital information from one point to another through a transmission channel using the least amount of information transfer as is possible. In other words, the object is to eliminate the transmission of unnecessary information. Video images, by their very nature, contain a great deal of redundancy and thus are good candidates for data compression. A straight-forward digital representation of an image necessarily contains much of the same redundancy both in a spatial sense and a temporal sense. By removing a portion of the redundancy from the image data at the transmitter, the amount of data transmitted over a communications channel or recorded on a storage medium may be substantially reduced. The image may then be reconstructed at the receiver or, if recorded, in the recorder playback electronics by reintroducing the redundancy. (The expression "image data" as used herein refers to data defining an image to be displayed.)

From a very general perspective, there are two classes of data compression: lossless compression and lossy compression. Lossless compression, as the name implies, allows the original data to be exactly reconstructed after being compressed without any loss of information. Lossy data compression is an irreversible process which introduces some amount of distortion into the compressed data so that the original data cannot be exactly reproduced. In order to obtain large compression factors for images, it is necessary to use lossy compression methods of the type described herein. Lossy compression may be an acceptable alternative as long as the amount and type of distortion produced in the reconstructed image are not objectionable. For example, in the professional video industry where the S/N is typically 57 dB or better, the compressed image must be virtually indistinguishable from the original, i.e., any more than 2 or 3 dB of signal impairment is objectionable since it is noticeable to viewers of a video display.

Image compression for use in conjunction with digital video tape re-corders has several unique requirements which impose additional constraints on any compression method used. The unusual constraints arise from the typical modes of use of a video tape recorder, and from the fact that the data must be stored for later use rather than immediately transmitted. For example, a tape recorder must allow editing of the recorded information. Practically, this means that the stored data for one field occupy an integer number of tracks on the tape or occupy defined blocks of video data, such as a television field, at predictable locations or tracks on the tape. This imposes the constraint that a field of data, or a transmitted and/or recorded data block is constant in length. Such a seemingly simple constraint places a severe design requirement on any compression scheme. Because most images statistically have nonuniform probability density functions, the obvious solution to a digital signal having varying information content would be to allow the encoded data rate to vary on a frame-by-frame or field-by-field temporal basis according to the image content. But because of editing requirements, the encoded data rate must be fixed rather than variable.

Video tape recorders for television broadcast applications must also allow pictures to be reproduced at other than normal record/playback tape transport speeds. At exceedingly higher playback speeds associated with the picture in shuttle mode, only a fraction of the data on each track is recovered. This requires that the compressed recorded data be stored in small complete data blocks from which a portion of the picture may be recovered. Also an editing feature in a recorder places additional restraints on a compression method. In the edit mode, recorded information is replaced by new information, which requires that the smallest unit of information to be replaced (in television signals this is a single field) be allotted a fixed space in the recorded data format. This allows any unit of a video signal to be replaced with any equally sized unit of a video signal. To maintain maximum efficiency in recording, and to minimize gaps for record over-runs, it is best to use a record format which has a fixed short period related to the original uncompressed information. This simplifies the design of the data deformatter by providing a regular and expected structure to the data stream recovered from tape. This regular structure allows "intelligent" deformatting of the data because certain patterns may be identified as errors and ignored.

Heretofore, various digital video compression studies have focussed on the two-dimensional discrete cosine transform (the DCT) for use as the preferred adaptive coding vehicle, due to its energy compaction properties and relative ease of implementation with digital circuits. (See "Discrete Cosine Transform," *IEEE Transaction on Computers*, vol. C-23, Pg. 90-93, Jan. 1974.) To perform a transformation on a video image, the image is first divided into blocks of pixels (e.g. $16 \times 16$ or $8 \times 8$), and then cosine transformed into a set of transform coefficients, each of which represents a scalar weighting parameter (i.e., a coefficient) for a two-dimensional cosine transform function. In the cosine transform domain, the amplitude coefficients are concentrated at the lower frequency terms with many of the upper frequencies being zero valued. If the coefficients are coarsely quantized into integral values and then Huffman coded, the number of bits needed to represent the image are greatly reduced. A key factor in making this scheme work effectively is the quantizing process. If the quantization is too fine, the data generated by the Huffman coder will exceed the data rate of the channel (or recorder), while too coarse a quantization results in unacceptable distortion/noise. One technique for determining a suitable quantization parameter for the required data rate simply monitors an output buffer memory and, using a feedback scheme, adjusts the quantization level to maintain an equilibrium of data in the buffer. This method is described in the article, "Scene Adaptive Coder" by Chen et al., appearing in *IEEE Transactions on Communications*, Vol. Com. 32, No. 3 (March 1984). It is also described in U.S. Pat. No.

4,302,775. However, in recording processes methods utilizing buffer fullness do not lend themselves to accurate rate control over small amounts of information, and thus do not enable efficient and accurate editing and picture in shuttle. Bit allocation methods as utilized in the past do not produce the quality of images that are desired if a relatively wide range of different images defined by the data are to be reduced.

In some instances, such as the one described immediately above, a threshold level is applied to the transformed data coefficients. That is, all values below a certain threshold are considered to be zero. This thresholding also is often considered to be quantization, and as used herein the terminology applying a "quantization" or quantizing parameter is meant to include applying a threshold level value, a scaling factor or other numerical processing parameter.

It is generally desirable to vary the quantizing parameters to produce the smallest increase in visible distortion of a compressed video image while still providing a desired output data rate. The parameter which may be changed to best advantage changes as the data rate changes, which is a function of the information content of the image. Different sources of data and to a lesser degree different images are optimally quantized by different strategies since the information content thereof changes. The distortion problem is particularly acute in many television applications in which reprocessed image quality is important. It is also necessary for most of such applications that multiple generations of compression i.e., multiple compression/expansion cycles are made without noticeable increase in degradation with successive generations.

It is a general object of this invention to provide a data-compression scheme operable in real-time and suitable for recording and playback on a magnetic tape recorder or other recording medium.

It is another object of this invention to provide an apparatus and method of adaptive image coding using a feedforward technique for estimating a variable quantization parameter.

It is a further object of this invention to provide an iterative process for estimating a quantization parameter Q for scaling encoded compressed data so that the original input data can be stored in a smaller fixed space on the recording medium (magnetically, optically or electrically) than would otherwise be possible without the data compression process.

SUMMARY OF THE INVENTION

The present invention relates to a data compression technique for reducing the data rate $D_{in}$ of a digital input signal to a lesser data rate $D_{out}$ of an output data channel. A feedforward technique utilizes a selected series of bit calculating stages, each having similar delays and bit counting means, whereby successive iterations of transformed data to estimate one or more quantization parameters Q for encoding such data. Most desirably, in accordance with the feedforward technique the very same data that is to be quantized is used to estimate the value of the quantization parameter to be applied to it. The estimation process preferably is iterated a number of times with the updated trial values being found through each estimation and used as the new trial value for subsequent estimations. In a preferred embodiment, an initial trial value is selected by a data by passing, or look ahead technique which allows examining a portion of data in advance, and assures that its value is within range of the final quantization parameter which is desired. The estimation process therefore converges to provide the final quantization parameter which assures that when the data being quantized is encoded, the output data rate closely matches the desired output rate.

The bypassing of data to be quantized enables quantization parameters to be calculated which are close to optimum. In the preferred embodiment described hereinafter, such data is quantized before passing serially through an encoder for transmission through an information channel. In this connection, the estimated value of the quantizing parameter is determined during real time, i.e., essentially at the time the original data is being generated. Since it is run at real-time speeds, it is also capable of being performed by a computer at non real-time speeds.

More specifically, with respect to a data source corresponding to a video image, a spatial-domain (time-based) signal, such as 4,2,2 luminance and chrominance, are transformed in predetermined blocks of data (e.g., $4 \times 8$ pixels) to a spatial-frequency domain signal, i.e., a discrete series of numerical values representing discrete frequency coefficients.

The concepts above are embodied in both methods and apparatus. The invention includes other features and advantages which will become apparent from the following, more detailed description of preferred embodiments.

BRIEF DESCRIPTION OF THE DRAWINGS

For a better understanding of the invention as well as other objects and further features thereof, reference is made to the following description which is to be read in conjunction with the accompanying drawings wherein:

FIG. 4 is a detailed timing diagram of the embodiment of the invention depicted in FIG. 2.

DETAILED DESCRIPTION OF PREFERRED EMBODIMENTS

The preferred embodiments of the invention to be described are designed especially to provide data compression in such a way that the encoded data is in formatted units, each unit being substantially the same length as the space allotted in typical tape formatting for such digital data. In this connection, the format on video recording tape is designed to allow recovery of subsections of an image. The preferred embodiments of the invention facilitate the recording of data within that format, allowing recognizable reconstruction of portions of a field of the image and thereby enabling picture in shuttle. In other words, the number of bits to be recorded desirably is the same as the number required by the format's space on the recording tape.

Figure 1:
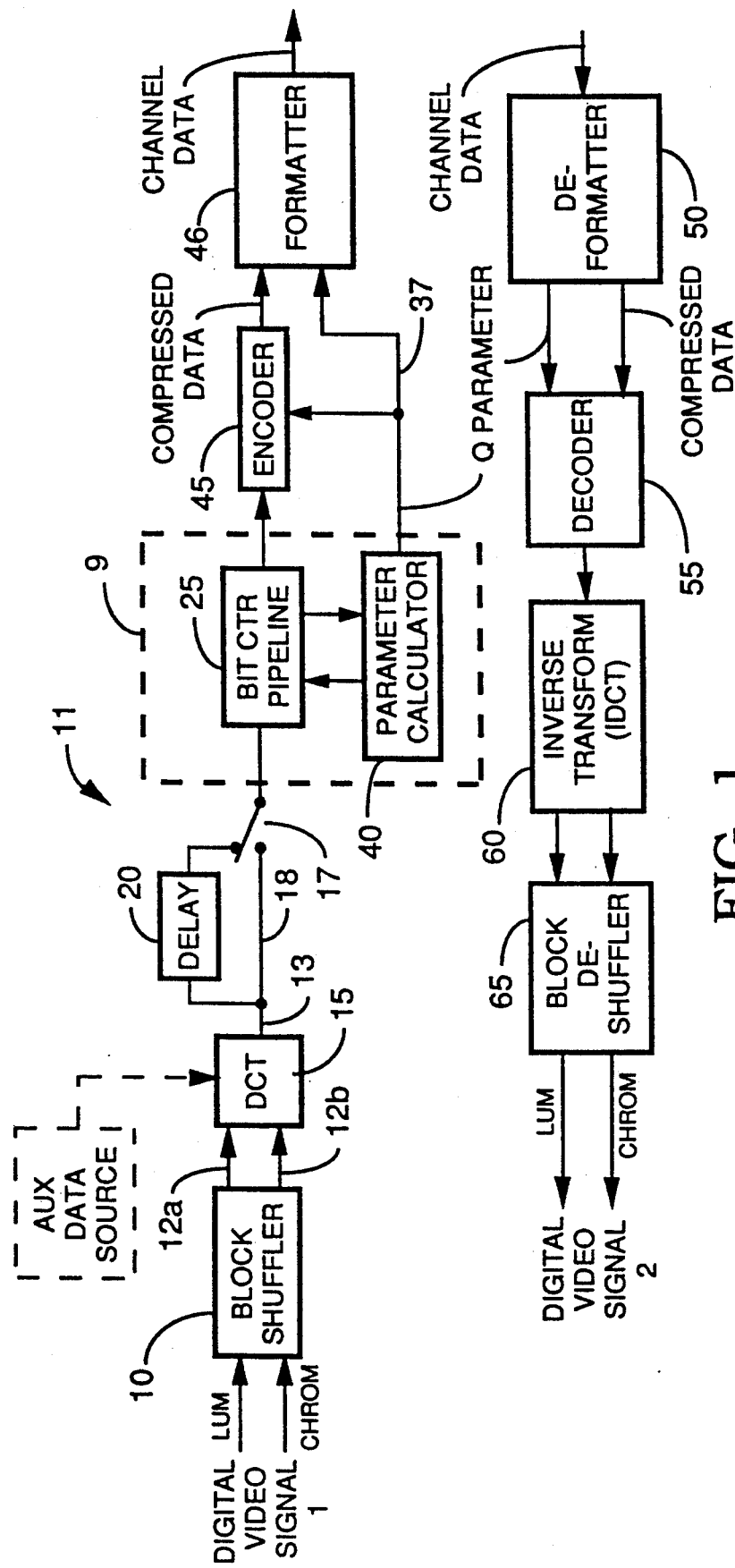
FIG. 1 is a simplified functional block diagram of an embodiment of the present invention.
Figure 2:
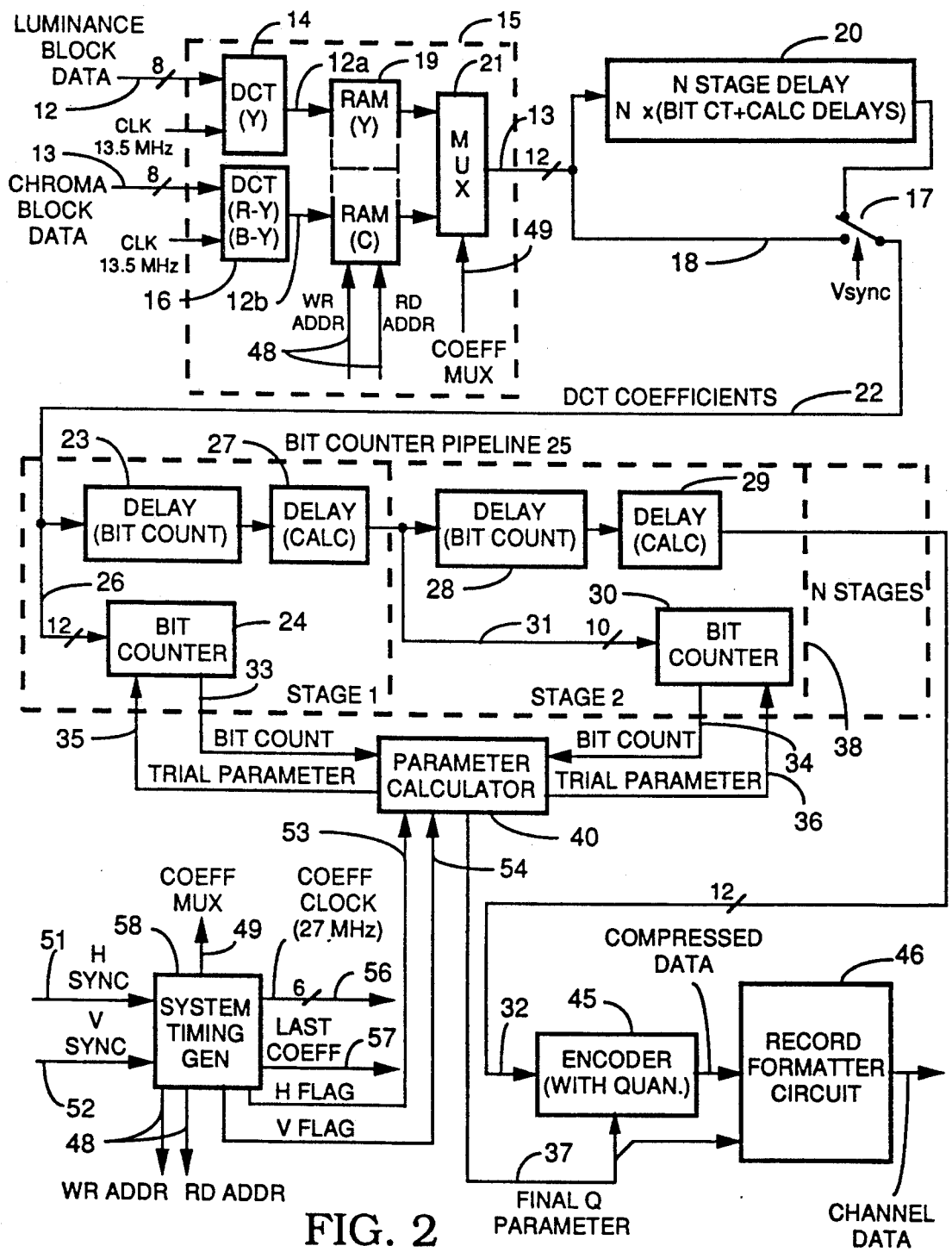
FIG. 2 is a more detailed electrical and functional block diagram of the embodiment of the invention depicted in FIG. 1.

The purpose of FIG. 1 is to facilitate an overall understanding of the functional operation of a preferred embodiment of the invention which is generally referred to by the reference numeral 11. Greater detail of individual sections of the components depicted in FIG. 1 are shown in FIG. 2 et al.

Referring to FIG. 1, the input digital video signal 1 represents image data to be compressed, transmitted over a data channel (or recorded and played back on a recording device), then uncompressed and outputted as digital signal 2. In this particular embodiment, video signals 1 and 2 are in a CCIR 601 standard format, i.e. luminance data and two components of chrominance data. Such a signal is a spatial (time) domain signal which will be transformed during the compression process to a spatial frequency domain signal.

Block shuffler 10 accepts the luminance data and chrominance data, partitions it into predetermined blocks of data (in 4×8 pixel arrays) and rearranges the data blocks within each field of video. Such shuffling of data can be performed on either a one- or two-dimensional basis. Basically it aids in distributing the information content of a typical video image more evenly which enhances the performance of the data compression process. This is particularly important if the statistics of the data within one field of video differ greatly. The rearranged video data is next transformed to a spatial-frequency domain signal by a two-dimensional discrete cosine transform (DCT) circuit 15. The DCT circuit transforms each data block in a shuffled pattern into an equivalent data block representing transform data coefficients, that is, scalar coefficients of frequency terms. The transformed data coefficients are time delayed in delay unit 20 an amount defined to be eight data sets long, (each "data set" is 23 blocks of data); eight data sets are equivalent to the active portion of eight horizontal lines of video. At the start of a new field of data, after the vertical blanking interval, the first set of data enters the delay unit 20 and also is shunted, via a look ahead path 18, to the bit counter pipeline 25. Applying the first data set of a new video field to the quantization estimator 9, enables an initial trial quantization parameter $Q_t$ to be established for the data set in that field. This is used in determining the final value for the quantization parameter $Q_f$.

The bit counter pipeline 25 goes through an iterative process of determining the quantization parameter. For the first data set, estimator 9 iteratively selects trial quantization parameters, determines the number of bits that would be produced by the encoder unit 45, and compares the computed number of bits with the desired number of bits (3600) for that time period. Whatever the difference, a new estimate for the parameter is chosen based upon a calculation process termed a bisection algorithm. The next stage in the quantization estimator 9, performs the same function again only using an updated quantization parameter. The process is continued (four times in the preferred embodiment) until the initial trial quantization parameter $Q_t$ is generated. At this point, switch 17 connects the delay 20 output to the estimator 9, which starts the quantization parameter estimation process over again for the first data set, and then for each subsequent data set. However instead of using an arbitrary value of Q, the initial trial quantization parameter $Q_t$ derived from the first four iterations of the first data set is used as the initial quantization parameter. The net effect of using this initial trial quantization parameter $Q_t$ is to speed the convergence process up with a minimum number of iteration stages in estimator 9. The final quantization parameter $Q_f$ is generated on path 37 where it is fedfoward to the encoder 45 and used to quantize the associated data set in accordance with the feedforward technique. Each quantized data set is encoded and sent to a channel formatter 46 which adds a sync word, error correction, an internal check-sum and the log of the value of $Q_f$ for each encoded data set.

The transmitted data is received (or played back on a recorder) and applied to a deformatter 50 which separates the data into a compressed data path and the quantization parameter $Q_f$ path. Decoder 55 decodes the data and, using the value of $Q_f$ for each data set, expands the quantized data back to their "original" levels. Since the signal at the output of decoder 55 represents transformed data coefficients, the inverse transform unit 60 reverses the DCT process performed by DCT unit 15. Block deshuffler 65 rearranges the data blocks in the same format that originally appeared at 12a and 12b.

It is to be understood that data, other than the video signal supplied via the block shuffler 10, which contain a great deal of redundancy, may be processed by the invention combination.

It should be noted that the number of stages in the estimator depends on many things including e.g., the estimation algorithm, the range of entropy of the source, and the degree of distortion which is tolerable. In a specific implementation of the invention, there are four stages in the estimator 9. Without the determination of the initial trial quantization parameter $Q_t$, which as pointed out above aids in determining the final value for the quantization parameter $Q_f$, the estimator 9 would probably need to be several stages longer to obtain the precision required for optimum operation. Conversely, if the input data source did not have a vertical blanking interval, the initial look ahead path 18 and associated delay unit 20 could not be used without the loss of data during the initial estimation process. However, the basic process would still function providing the probability density function could be characterized as a Markov process with a moderate to high autocorrelation function.

Referring to FIG. 2, the encoding portion of the circuitry of FIG. 1 is shown in greater detail, wherein similar components are similarly numbered. The luminance image block data are supplied to the DCT circuit 15, and in particular to a DCT unit 14 therein, via the 8 bit bus 12 of previous mention. The chrominance image block data are supplied via the 8 bit bus 13 to a similar DCT unit 16 within DCT circuit 15. The DCT units 14, 16 are clocked via a 13.5 MHz clock, wherein the DCT unit 14 performs a 2-dimensional discrete cosine transform on the 4×8 pixel blocks of the luminance, or Y component, while the DCT unit 16 synchronously performs a 2-dimensional discrete cosine transform on the pairs of 4×4 pixel blocks of the associated chrominance components R-Y, B-Y. As a block of luminance data is written into the DCT unit 14, the corresponding two 4×4 blocks of R-Y, B-Y chrominance data are written into the DCT unit 16 in sync with the associated 4×8 luminance block. The DCT units 14, and 16 may preferably be implemented with a Thompson integrated circuit model TV 3200. A typical transform device and operation is described in the article "Discrete Cosine Transform" of previous mention.

It is preferable that the discrete cosine transform coefficients supplied by the DCT circuit 15, be arranged in the data stream in the order in which they are to be recorded on the tape. However, the video data supplied to the DCT units 14, 16 via the block shuffler 10 of FIG. 1, originally was raster scanned over a video field, whereby accordingly, the numerical values are in full field raster scan time order. The block shuffler 10 rearranges the data into a time order corresponding to the physical blocks in the image and further scrambles the data by selecting blocks in an order other than the original sequence of blocks in the image. Thus it is preferable to rearrange the data blocks which compose a data set into the order in which they are to be encoded and recorded on the tape or recording medium in data sync blocks of an allotted length.

To this end, the transformed luminance data and the two components of chrominance data R-Y, B-Y are supplied via buses 12a, 12b, to respective luminance and chrominance switched banks of random access memories (RAM), depicted herein as an integral RAM 19 which, in turn, are coupled to a multiplexer 21. The RAM 19 consists of two banks, alternately written into and read out, and thus allows the data to be written into one memory bank while it is thereafter selectively read out of the other bank in the order which supplies the stream of transformed data coefficients in the same order in which the data is to be encoded, and in which it is to be recorded on tape as data sync blocks of an allotted length. The RAM 19 is loaded and read out by means of coefficient write address (WR ADDR) and coefficient read address (RD ADDR) signals on a pair of buses 48. The multiplexer 21 is under control of a coefficient multiplexing signal (COEFF MUX) via a bus 49, which signal directs the multiplexing of the luminance and chrominance coefficients into the ordered data stream.

The transformed data coefficients are supplied via bus 13, as a serial stream of 12 bit words from the DCT circuit 15 to an input of the N stage delay 20, as well as to the look ahead bus 18 which extends to an input of the electronic switch 17. The N stage delay may be formed of a series of shift registers, or a RAM. The data stream from the DCT circuit 15 includes one transform coefficient for each pixel in each block. That is, there are the same number of coefficients in the data stream of DCT units, 14, 16 as there were sampled values in the luminance and chrominance data blocks supplied to the units. The N stage delay 20 provides a time delay equal to the total delay required to clock one complete data set through the pipeline 25 delays, wherein a data set corresponds to a number of clock periods of one horizontal line of active video. That is, the delay of the N stage delay 20 corresponds to the number of estimation iterations performed by the various stages of the bit counter pipeline 25 during the determination of a value for the final quantization parameter, as further described below. In the implementation described herein by way of example only, four stages perform four iterations of the estimating process.

In accordance with an added feature of the invention, means are provided for bypassing and thus examining in advance the transformed data coefficients during each vertical blanking interval, whereby a value for the "intial trial quantization parameter" $Q_t$ of previous mention, which is to be used for the remainder of the field, is estimated. It is preferred for this initial determination of an initial trial estimate that the data on which it is based be selected from throughout the field by, for example, rearranging the data as discussed by way of example in the block shuffler of FIG. 1. To this end, immediately following the vertical blanking interval, (for example, during the vertical blanking interval as seen at the output of the N stage delay 20), the first data set of transformed data coefficients of a field is fed into the N stage delay 20 to be selectively delayed thereby, and simultaneously is bypassed around the N stage delay 20 via the look ahead bus 18 and switch means 17. The technique allows a quantization parameter to be determined which may be used to optimally quantize the transformed data supplied by the DCT circuit 15. Given the shuffled data derived via the shuffler 10, the present look ahead scheme applies an "arbitrary coarse quantization parameter" to the first data set supplied to the quantization parameter estimator 9, whereby the value of the parameter is refined in a first pass of the first data set through the estimator 9. A "coarse trial quantization parameter" ($Q_{tc}$) is calculated at each stage of the pipeline 25, and a "coarse final quantization parameter" ($Q_{fc}$) is provided at the end of the first pass of the first data set which is bypassed. This coarse final quantization parameter $Q_{fc}$ is the same value as the "initial trial quantizing parameter" $Q_t$ of previous mention, which is used as the initial quantizing value for not only the second pass of the first data set through the estimator 9, but for all the subsequent data sets which follow during the active video interval of the entire field. Since the look ahead scheme provides a quantization parameter which has been refined through four iterations, the data sets supplied during the active video interval need only one pass through the estimator 9 using the "intial trial quantization parameter" $Q_t$ at the first stage, to arrive at the optimum "final quantization parameter" $Q_f$ of previous mention.

Thus as mentioned above, immediately after the first data set is bypassed through the quantization parameter estimator 9, the same first data set is read from the N stage delay 20 and is passed the second time through the pipeline 25 to derive the "final quantization parameter" $Q_f$ for the first data set. All the data sets of the active video interval thus need be passed only once through the pipeline 25 to derive respective final quantization parameters. As depicted, the switch 17 is enabled by the rising edge of a delayed system vertical sync signal ($V_{sync}$). The operation of the look ahead path 18 and the N stage delay 20 is further described below with respect to the FIGS. 2-4.

The transformed data coefficients in either the look ahead path 18 or the delay 20, are supplied via a 12 bit bus 22 to a quantization parameter estimator formed of a bit counter pipeline 25 and a parameter calculator 40. The quantization parameter estimator derives the final quantization parameter that provides that degree of compression which, when the data is supplied to the Huffman encoder 45, will supply the proper number of bits to fill the allotted space in the respective data blocks to be recorded on the tape. That is, the data sets of 23 blocks each have a similar spacing allotted to them on the tape in the form of a data sync block space for each data set. By way of example, each data set is allotted 3600 bits or 450 bytes as one data block recorded on tape. The 3600 bits constitutes the information part of the data block recorded on tape and additional space is allowed for sync words, overhead, etc.

Thus the quantization parameter estimator 9 includes two parallel data paths. One path is a delay path where the transformed data coefficients are passed through a series of delays and eventually are encoded in the encoder 45. The other path includes the bit counters 24, 30, etc., and the parameter calculator 40, which together provide the means for generating and refining the trial quantization parameters to provide the final quantization parameter which, when the discrete cosine transform coefficients are compressed and coded, will provide the number of bits allotted for recording in respective data blocks on the tape.

To this end, the transformed data coefficients are supplied as 12 bit samples via the bus 22 from the switch means 17, to a first "bit count" delay 23, as well as to a first bit counter circuit 24 via a 12 bit bus 26. A "calculation" delay 27 is coupled to the bit count delay 23. The bit count delay 23 provides a time delay commensurate with the time it takes the bit counter 24 to count the bits in a data set. The calculation delay 27 provides a time delay commensurate with the time it takes the parameter calculator 40 to perform a calculation which determines if the derived trial quantization parameter provides the compression required to allow recording the subsequently encoded data in the allotted space on the tape. For example, each of the bit count and calculation delays in the delay path have a delay of one horizontal line of active video, plus a few clock cycles. The delays 23 and 27 and the bit counter circuit 24 comprise the first stage of the bit counter pipeline 25. The second delay stage also includes a bit count delay 28, a calculation delay 29, and a second bit counter 30 which is coupled to receive the data stream from the calculation delay 27 of the first stage via a bus 31. The second stage is coupled to successive third and fourth identical stages (indicated as "N stages" but not shown) depicted by the dashed line 38 in FIG. 2, wherein four stages are employed in the implementation and description of the invention herein, by way of example only. The output of the N stages is supplied to the encoder 45 via a bus 32. The encoder 45 output is coupled to a record formatter circuit 46 which supplies the properly formatted, compressed and encoded data for recording on a tape via an associated video tape recorder (not shown). Alternatively, the data may be supplied to suitable transmission apparatus or to other types of recording apparatus and media.

The parameter calculator 40 receives a bit count signal via a bus 33 from the bit counter 24 of stage 1, as well as a bit count signal from the bit counter 30 of stage 2 via a bus 34. In turn, the parameter calculator 40 supplies trial parameters derived via sequential calculations as further described below, to the bit counter 24 via a bus 35 and to bit counter 30 via a bus 36. The parameter calculator 40 also is similarly coupled to the subsequent third, fourth, etc., stages. Upon performing the final refinement required to provide the final quantization parameter via, the multiple stages of the bit counter pipeline 25, the parameter calculator 40 supplies the final quantization parameter $Q_f$ to the encoder 45 via a bus 37.

A timing signal generator 58 is supplied with system horizontal and vertical sync signals ($H_{sync}$, $V_{sync}$) on lines 51 and 52, respectively, to identify the horizontal and vertical spatial and temporal position of the data. In response thereto, the generator 58 provides various timing signals and clocks for enabling and synchronizing the operation of the various components of the data compression apparatus. Thus, the generator 58 provides the coefficient WR ADDR and coefficient RD ADDR signals to the RAM 19 via the buses 48, and the COEFF MUX signal to the multiplexer 21 via the bus 49. In addition, the generator 58 supplies the parameter calculator 40 with $H_{sync}$ and $V_{sync}$ related timing signals H FLAG and V FLAG via lines 53, 54, respectively, to synchronize the parameter calculator 40 read bit count and write operations with the passage of data through the pipeline 25. The generator 58 also generates a coefficient clock (COEFF CLK) signal and a last coefficient in data set (LAST COEFF) signal on buses 56 and 57, respectively, which are used by the bit counter circuits 24, 30, etc., of the N stages, as further described in FIG. 3.

The bit count delays and the calculation delays of the respective delay stages are, in practice, a combined delay of a preselected length, but have been separately conceptualized herein for clarity of description. As previously mentioned, the bit count delays compensate for delays caused by the process of counting bits via the bit counter 24, and supplying the count to the parameter calculator 40. The calculation delays compensate for the delays incurred by the parameter calculator 40 while performing the computations for determining if the number of bits is too large or too small, and the value of a successive quantization parameter, for respective stages of the estimation process.

FIG. 4 depicts a timing diagram for quantization parameter estimator 9. FIG. 4A depicts the waveforms of the successive data sets of transformed coefficients at two different times during the field of video; the left half of the diagram depicts the waveforms during the active video interval, and the right half depicts them during the vertical blanking interval. The data sets are alternately labeled phase A ($\phi A$) and phase B ($\phi B$), since they are 1 H delayed by each of the bit count and calculation delays in each stage. At the end of the vertical blanking interval, H FLAG and V FLAG signals (FIGS. 4F and 4G, respectively), are generated via the timing generator 58 from the Hsync and Vsync signals. The parameter calculator 40 reads the H Flag signal and loads the quantization parameter into the proper bit counter (FIG. 4D). The bit counters of the pipeline 25 pseudo encode the information and count the total number of bits for a data set after quantization (FIG. 4B), using the trial quantization parameter $Q_t$ supplied by the parameter calculator 40. The parameter calculator 40 then reads the bit count supplied via the respective bit count bus (FIG. 4C) and performs a calculation to determine if the number of bits which emerge from the encoder upon compression using the trial quantization parameter $Q_t$, is too large or too small. If the number of bits is incorrect, the calculator 40 also computes a refinement of the previous trial quantization parameter (FIG. 4E) and supplies it to the next bit counter stage via its respective trial parameter bus (FIG. 4D). The succession of bit counts and trial parameter refinements are continued through the delay path and bit counters of the N stages of the bit counter pipeline 25 in cooperation with the parameter calculator 40. During the period of time that the bit counters are running and the parameter calculator 40 is determining the trial quantization parameters, the data coefficients that are supplied via the bus 22 are being passed through the delay path. At the end of the bit count and calculation processes, the succession of delayed data sets are supplied to the encoder 45 via the bus 32 in sync with their respective final quantization parameters supplied via the parameter calculator 40 on the bus 37.

In addition, the final quantization parameter $Q_f$ is supplied to the record formatter circuit 46, in the $\log_2$ representation. The formatter inserts it in the relevant sync block of each data set in the formatted data stream supplied to the recorder or transmission apparatus. Thus the parameter $Q_f$ is itself very efficiently stored in the recording media.

To describe the operation of the quantization parameter estimator 9 more fully, and as previously mentioned, the switch 17 is switched to the look ahead path 18 just prior to the first data set entering the delay 20, to provide the path bypassing the delay. It should be noted that the switch 17 is not activated to bypass the delay 20 until after passage through the downstream pipeline delays of all of the image data for the previous field. The first data set is supplied directly to the first stage of the pipeline 25 and in particular to the bit counter 24. At this time, the parameter calculator 40 loads the arbitrary coarse quantization parameter of previous mention into the bit counter 24 via the bus 35. The coarse quantization parameter is kept stored in memory in the calculator 40 and is, for example, ½ Log$_2$ 32 or 2.5. The bit counter 24 counts the bits generated using the coarse quantization parameter and supplies the count to the calculator 40 via the bus 33, which determines if there are too few or too many bits. The calculator 40 provides the coarse trial quantization parameter $Q_{tc}$ to the bit counter 30 of the second stage via bus 36, which also receives the data coefficients via the bus 31. The bits are counted again, another coarse trial quantization parameter is calculated, and the process continues through the four stages, until the coarse final quantization parameter $Q_{fc}$ for the bypassed first data set is calculated. The switch 17 is switched to the N stage delay 20 which now contains the same first data set at its output. The first data set thus again is supplied to the bit counter pipeline 25, the initial trial quantization parameter $Q_t$, corresponding to the coarse final quantization parameter $Q_{tc}$ provided at the end of the first pass of the first data set, is supplied to the bit counter 24, and the first data set is passed through the four stages a second time. The final quantization parameter $Q_f$ thus is provided after eight refinements are made to the first data set via the parameter calculator 40. The initial trial quantization parameter $Q_t$ is stored in the calculator 40 and is used subsequently as the first parameter for each data set of the active video interval of the entire field of video.

The parameter calculator 40 in the embodiment described herein, may be a digital signal processing microprocessor such as available, for example, in the TMS 32020 family of microprocessors manufactured by Texas Instruments, Inc. To provide the trial quantization parameters, the calculator 40 provides the log$_2$ of the scaling factor to a scaling and rounding off process in the bit counters 24 and 30 corresponding in general to a pseudo quantization of the transform coefficients in one data set. Thus the quantization parameter estimator 9 performs a multiplication with the reciprocal of the scaling value of the numerical values of the transformed data coefficients, and then rounds off the result to the nearest integral value. Upon retrieving the recorded information as via the decoder portion of the circuitry depicted in FIG. 1, the data values are multiplied by $2Q_f$ where $Q_f$ is the number corresponding to the final quantization parameter $Q_f$ which previously was inserted into each data set via the record formatter circuit 46.

The selection of the arbitrary coarse quantization parameter for the look ahead estimation depends largely on the nature of the algorithm used to provide the trial parameter estimation calculations. The optimum algorithm for any particular implementation is the one which requires the fewest iterations to arrive at a set of quantization parameters that provide the correct number of bits after coding. In the embodiment described herein, the algorithm is a bisection method which controls only the quantization scaling factor parameter. This algorithm does not make use of the magnitude of errors, only a sign and zero test are used. The result is that it is numerically stable. For a single quantizing and compression mode, a linear interpolator may function equally well.

Figure 3:
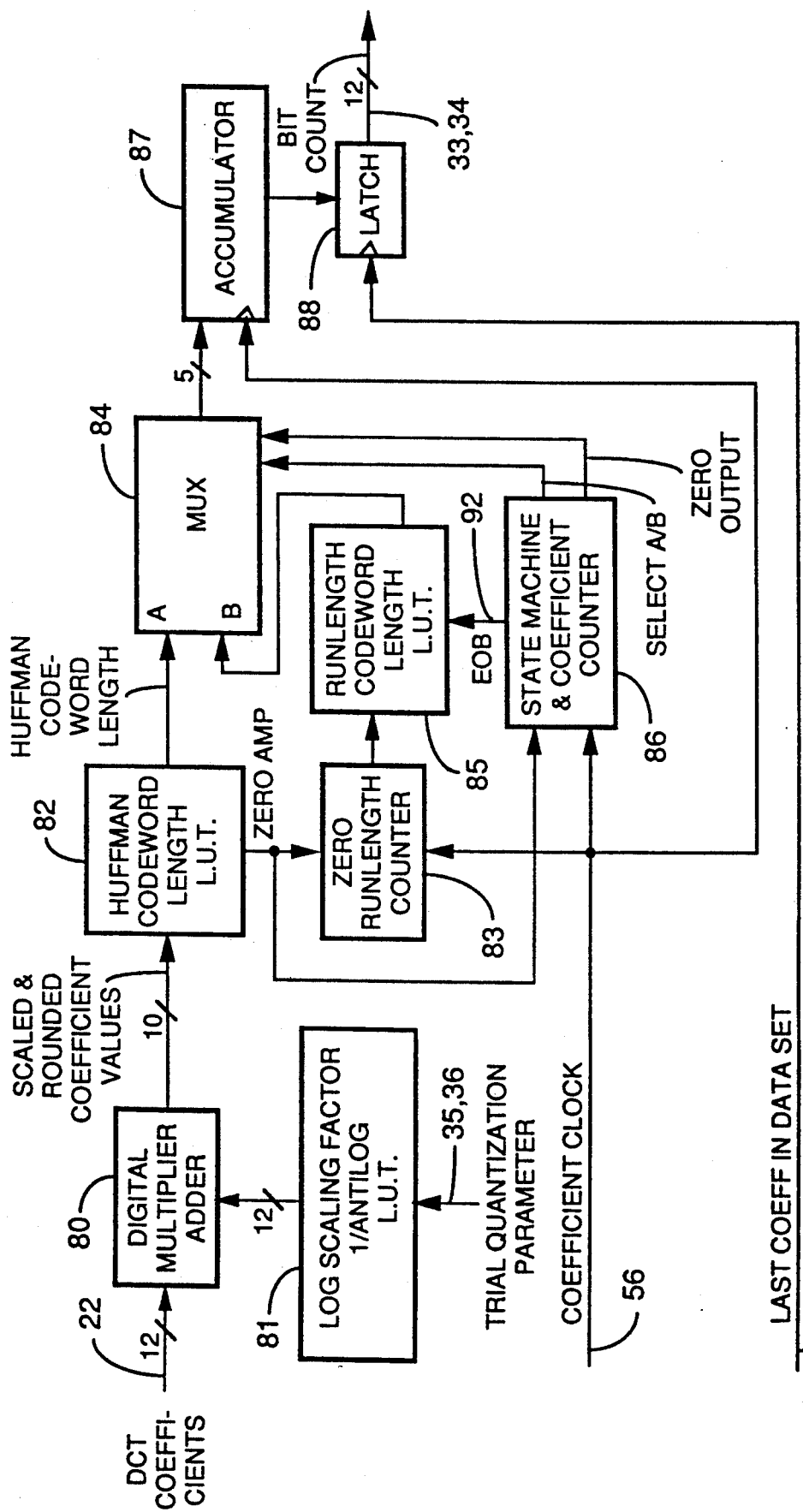
FIG. 3 is a more detailed electrical and functional block diagram of the bit counters shown in FIG. 2.

In this bisection method, the quantization steps are equally spaced in a logarithmic sense, i.e., successive quantizer scaling factor steps are in a fixed ratio. Thus, the logs of the quantization scaling factor are used in computation, for example, by the parameter calculator 40. This simplifies the implementation of the algorithm in a microprocessor by replacing multiplication by addition and square root by division by two. The antilog is simple to implement as a look-up table in programmable memory such as in the lookup table 81, of the bit counters (FIG. 3). Moreover, the equal spacing allows constant signal-to-noise ratio steps over the entire range of quantizing values.

The coarse quantization parameter is estimated as the center value, that is, the geometric mean, in the range of scaling factor values. The interval length for a given iteration is the overall $$\frac{Q_{max} - Q_{min}}{2^N}$$

where, $Q_{max}$ is the log of the maximum scaling factor value,
$Q_{min}$ is the log of the minimum scaling factor value, and
N is the number of the iteration, that is, the number of stages. (It can assume the value of 1, 2, . . . )

If the error in the number of bits resulting from coding the data after quantization as determined by the parameter calculator 40 is positive (too many bits), the next estimate is the previous value plus the current interval size. If the error is negative (too few bits), the next estimate is the previous value minus the current interval size. Of course if there is no error, the estimate determined is the correct quantization parameter.

The following illustrates an application of the bisection algorithm used herein to determine the value of a quantizer scaling factor. The basic formula for determining the next trial value for the quantizer is:

$$\log v_{ct} = \log v_{pt} + \frac{\log s_{pi}}{2} \cdot \text{Sign(bit error); where,}$$

$v_{ct}$ is current trial value,
$v_{pt}$ is previous trial value,
$s_{pi}$ is previous interval size, and $$\text{Sign(bit error)} = \begin{cases} +1 \text{ if \# bits} > \text{desired \# of bits} \\ 0 \text{ if \# bits} = \text{desired \# of bits} \\ -1 \text{ if \# bits} < \text{desired \# of bits} \end{cases}$$

The base of the logarithm may be any convenient value such as 2. An appropriate base would maximize the arithmetic accuracy of the calculation. The following shows the range of values of the quantization parameter Q, showing first trial value;

First Trial Value of $Q_t = \frac{\log_2 32}{2} =$ 2.5 = the geometric mean of 32.

Initial interval length = 2.5,

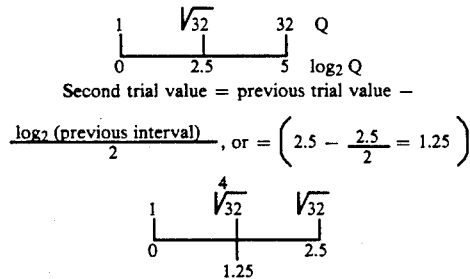

Second trial value = previous trial value −

$\frac{\log_2 (\text{previous interval})}{2}$, or $= \left(2.5 - \frac{2.5}{2} = 1.25\right)$ The range of Q after the second bit count result is, too many bits ⇒ sign of (counted bits-required bits) is positive as shown below. Bisection to a larger value of Q is performed.

Since all of the data defining a field passes through the same data pipeline 25, the latter also provides the delay path for the following data, not simply the data which is supplied during the vertical blanking interval. In other words, while subsequent data in the same field passes through the pipeline 25 only once, the initial data set of samples used in the look ahead process is passed through the pipeline twice. However, as discussed, it is the value derived during the first pass of the first data set instigated during vertical blanking, that is used as the initial trial quantization parameter for every subsequent data set of the entire field. However, if desired, the estimated parameter for a data set of a previous field can be used as an initial trial value for the estimation of the parameter for the data sets of a subsequent field.

It is to be remembered that it is not always possible to generate a set of parameters which will result in exactly the desired number of bits. One reason for this is that the quantization parameters themselves are quantized. Therefore, to avoid the problem of generating more code bits than can be stored in the preselected space in the tape format, the required number of bits after coding is decreased slightly in the parameter calculator 40, so that errors are biased in the direction of too few bits for the format. This bias may be of the order of −1. %.

FIG. 3 illustrates by way of example, additional details of an implementation of the bit counters of the bit counter pipeline 25, wherein like components are similarly numbered in the figures. The bit counters perform in the manner of the Huffman encoder 45 except that they do not generate the Huffman code words. In FIG. 3, the transformed data coefficients are supplied via the 12 bit bus 22 to a digital multiplier/adder 80, which multiplies the data coefficients by 1/antilog of the trial quantization parameter supplied by the parameter calculator 40 of FIG. 2 via the buses 35, 36. The trial quantization parameter first is supplied to a log scaling factor lookup table (LUT) 81 which, in turn, supplies a multiplier term via a 12 bit bus to the multiplier/adder 80. Since the parameter calculator 40 deals in the logarithm of the quantization parameter, the log scaling factor lookup table 81 provides a corresponding arithmetic scaling term for use by the multiplier/adder 80. The multiplier quantizes the data coefficients supplied via the bus 22, by the value derived via the lookup table 81 representing the trial quantization parameter from the parameter calculator 40. The adder in the multiplier/adder 81 provides the rounding of the scaled value to the nearest integer.

The resulting scaled and rounded data coefficients are supplied via a 10 bit bus to a Huffman code word length lookup table 82, which determines the number of bits it would take to encode each value of the data sets given the value of the quantization parameter applied via the bus 35, 36. The Huffman code word length lookup table 82 thus supplies two outputs. The first output is a Huffman code word length signal supplied to the A input of a multiplexer 84, and the second output is a zero amplitude signal (ZERO AMP) that is, a signal which indicates when the rounded coefficient value is zero, and which is supplied to a zero runlength counter 83. The zero run length counter measures the length of runs of consecutive zeros. The zero runlength counter 83 is coupled to a runlength code word length lookup table 85 whose output is supplied to the B input of the multiplexer 84. The zero amplitude output from the Huffman lookup table 82 also is supplied to a state machine and coefficient counter 86 which, in turn, provides a SELECT A/B signal and a ZERO OUTPUT signal to the multiplexer 84, and an end-of-block (EOB) signal to the lookup table 85. The multiplexer 84 supplies an accumulator 87 with a multiplexed output signal formed of selected inputs of the Huffman code word length signal and of the runlength code word length signal, as controlled by the SELECT A/B and ZERO OUTPUT signals from the state machine 86. The output from the accumulator 87 is latched via a latch 88 which supplies the bit count signal to the parameter calculator 40 of FIG. 2, as exemplified by the buses 33, 34 of the first and second delay stages of FIG. 2.

The system timing generator 58 of description in FIG. 2 provides the COEFF CLK signal at a coefficient rate of, for example, 27 MHz to the zero runlength counter 83, the state machine and coefficient counter 86, and the accumulator 87 via the line 56, to synchronize the operation of the various components of the bit counter depicted in FIG. 3. The LAST COEFF signal is supplied to the latch 88 by the timing generator 89 via the line 57, and is used to latch the bit count signal at the end of the accumulation of an entire data set.

In operation, there are two main states in the state machine and coefficient counter 86. The first is when the zero amplitude signal from the Huffman lookup table 82 is zero, that is, is in a zero run condition, while the second is when the signal is non-zero and the Huffman coder is not in a zero run condition.

Regarding the first main state, the zero run state may be ended under two conditions; first, when a non-zero value ends the run and, second, when the last coefficient to code in the lookup table 82 is encountered. In the first condition, the state machine receives zeros and forces the multiplexer 84 to output zeros to the accumulator 87. When the non-zero value ends the run, the code word length for the zero runlength plus the length of the codeword corresponding to the value which ended the run is added to the accumulator via the multiplexer 84. In the second condition, the last coefficient to code is the 23 rd term in a data set, i.e., the end-of-block (EOB) coefficient of a data set. When the last coefficient to code is encountered, the EOB code word is used if it is shorter than the code word for the actual runlength. Otherwise the zero runlength code word is supplied to the accumulator 87, via the runlength code word length lookup table 85, in response to the EOB signal on a line 92.

Regarding the second main state, since the terms are nonzero, the corresponding Huffman code word is supplied to the multiplexer 84 which selects input A as the output signal. The signal is accumulated in the accumulator 87 which, at the end of a data set, will contain the total number of bits required to code the stream of bits if the quantization parameter is applied, and if the data stream is Huffman encoded using the table. The result is latched and held for several clock cycles via the latch 88 to allow the parameter calculator 40 (FIG. 2) to conveniently access the compressed data. Immediately upon latching the data, counting of a new data set is started via the quantization parameter estimator 9.

Although the invention has been described herein by way of a specific embodiment, it is to be understood that various alternative configurations and components are contemplated. To illustrate, there are various alternatives to the bisection algorithm used herein. More particularly, it is desirable for the algorithm used in determining Q to arrive at the same value in successive generations of compression of the same image. In that way, the image quality will not degrade in generations of compression beyond the first. There are various algorithms for determining the value of Q which will converge with a small number of iterations for images which have not been previously compressed. There are fewer algorithms which are numerically robust and converge rapidly in the case of images which have been previously compressed. The bisection algorithm has the advantage that is is very numerically stable. It achieves this stability at the expense of efficiency; that is, it requires many iterations to converge.

Accordingly, one alternative is to use a method which converges quickly, to closely approach the correct value, then use the bisection method to arrive at the final result. In general, the first method should use both the magnitude and the sign of the error to determine the next trial value. One such alternative assumes a fixed relationship between the rate error and the ratio of the current value to the next value. It may be implemented in a simple table look-up. When the rate error is less than a predetermined value, bisection is used to arrive at the final value.

There also are alternative encoding methods contemplated by the invention. That is, any method of encoding data using codes which are proportional in length to the entropy of the data (after the quantising step) may be used in place of the Huffman code. Although the Huffman code has the advantage of its relative simplicity of implementation, some other coding methods which may be utilized are; Tunstall coding, arithmetic coding, Lemple-Ziv coding, etc.

Likewise, the invention contemplates alternatives to the look ahead configuration applied during the vertical blanking interval. If the statistics of the data within one field of video differ greatly between data sets, the estimator value for the first data set may not necessarily be a good starting value for bisection on subsequent data sets of the field. Therefore, the invention contemplates the use of a bit counter pipeline with many more stages than the four stages illustrated herein, wherein each data set quantization parameter value is computed independently.

It is to be understood that the discrete cosine transform illustrated herein for providing the transformed data coefficients, is one of various transform methods which may be used to transform the uniform probability mass function, typical of images, to a set of uncorrelated nonuniform probability mass functions which are efficiently encoded. Accordingly, some other useful transforms which may be used herein are Hadamard, Slant, Hartely, etc.

Although the present invention is described herein as a real time system, it is equally applicable to a non-real time system such as, for example, may be employed in the computer field where images such as a single picture may be compressed.

There are many possible algorithms which could be used for computing the value of the quantization parameters. The optimum algorithm for any particular implementation is the one which requires the fewest iterations to arrive at a set of quantization parameters that provide the correct number of bits after coding. In one implementation of the instant invention, a bisection method which controls only the quantization step size parameter is utilized. This algorithm does not make use of the magnitude of errors, only a sign and zero test are used. The result is that it is numerically stable.

In the bisection method, the quantization steps are equally spaced in a logarithmic sense, i.e., successive quantizer steps are in a fixed ratio. Thus, the logs of the quantization step sizes are computed. This simplifies the implementation of the algorithm in a microprocessor by replacing multiplication by addition and square root by division by two. The antilog is simple to implement as a look-up table in programmable memory. Moreover, the equal spacing allows constant signal to noise ratio steps over the entire range of quantizing values.

As mentioned previously, there are two look ahead paths. It will be remembered that the initial parameter estimate used during a field is calculated based on use of the look ahead path 18 described previously. It is preferred for this initial determination of a coarse estimate that the data on which it is based be selected from throughout the field as briefly discussed above.

Although the invention has been described in connection with a preferred embodiment and specific implementation of the same, it will be appreciated by those skilled in the art that various changes and modifications can be made without departing from the spirit of the same. It is therefore intended that the coverage afforded applicants be limited only by the claims and their equivalents.

What is claimed is:

1. A method of preparing a digital video signal, having a data rate, $D_{in}$, for transmission as an encoded output signal, said encoded output signal to be transmitted over a channel having a preselected constant data rate capacity, $D_{out}$, which is less than the data rate $D_{in}$, said method comprising the steps of:

(a) transforming said video signal to a spatial-frequency domain digital signal formatted in groups of transform coefficients of generally varying information content;

(a1) estimating trial quantizing parameters from one of the groups;

(b) selecting in response to said trial quantizing parameters values of final quantizing parameters $Q_f$ for the groups of transform coefficients in accordance with their respective generally varying information content, which parameters $Q_f$ when applied to quantize the coefficients would generate respective encoded output signals with a predetermined number of encoded bits corresponding to said constant data rate $D_{out}$;

(c) quantizing said groups of transform coefficients of generally varying information content to integral values in response to respective said quantizing parameters, $Q_f$, to generate therewith groups of quantized coefficients of essentially constant information content; and (d) encoding said groups of quantized coefficients of essentially constant information content to produce said encoded output signal of said predetermined number of encoded bits corresponding to said constant data rate $D_{out}$.

2. The method of claim 1 wherein said selecting step further comprises the steps of:

(e) delaying, subsequent to said transforming step, said transform coefficients for a first predetermined period of time;

(f) selecting, while delaying said transform coefficients, a trial quantizing parameter $Q_t$ and counting the number of encoded bits that would be produced by said encoding step during said first predetermined period of time if $Q_t$ was used as the quantizing parameter $Q_f$;

(g) determining the difference between said counted number of encoded bits and the number of bits corresponding to the data rate $D_{out}$;

(h) applying, if said difference is 0, said trial quantizing parameter $Q_t$ in said step (c) for use as said quantizing parameter $Q_f$; and, (i) computing, if said difference is other than 0, an updated value for said trial quantizing parameter $Q_t$ so as to reduce said difference, and repeating steps (e)–(i) N times, $N > 1$.

3. The method of claim 2 wherein said transforming step (a) further comprises transforming said video signal using a discrete cosine transform.

4. The method of claim 2 further comprising at the beginning of each field of said digital video signal the step of:

(j) delaying, prior to said first delaying step, said groups of transform coefficients for a second predetermined period of time equal to
(N) (said first predetermined period of time), while also performing steps (e)–(i) N times on the same set of transform coefficients; and (k) applying the quantizing parameter $Q_t$ selected on the $N^{th}$ selecting step in (j) as the trial quantizing parameter $Q_t$ for the first selecting step for all subsequent trial quantizing parameters $Q_t$'s related to a particular field of said digital video signal.

5. The method of claim 1 further comprising the steps of:

(l) formatting subsequent to said encoding step (d) said encoded output signal into the format of said channel; and (m) interleaving with said formatted encoded output signals said quantizing parameter $Q_f$ with each encoded group of quantized coefficients to which said quantizing parameter $Q_f$ relates.

6. The method of claim 1 wherein the step of selecting includes:

examining in advance one of said groups prior to supplying all of the groups;

estimating a trial quantizing parameter, $Q_t$, from said pre-examined one of the groups; and determining, in response to said trial quantizing parameter, $Q_t$, for all the groups, the quantizing parameter, $Q_f$, which provides the encoded output signal with the predetermined number of encoded bits corresponding to said constant data rate $D_{out}$.

7. Apparatus for compressing a data signal defining a video image into a data space of a predetermined number of bits, comprising:

means for transforming said data signal to a digital signal formatted in groups of transform coefficients of generally varying information content;

means responsive to said groups of transform coefficients of generally varying information content for first estimating trial numerical processing parameters from a first of the groups, and then in response to the trial numerical processing parameters estimating the values of final numerical processing parameters which will quantize said transform coefficients into said data space of a predetermined number of bits; and means for applying said estimated parameters subsequently to the same said groups of transform coefficients which were used to estimate the parameters, to compress said groups of transform coefficients into respective data spaces of said predetermined number of bits.

8. Apparatus for compressing a data signal defining a video image, comprising:

means for transforming said data signal to a digital signal formatted in predetermined groups of transform coefficients;

means responsive to said predetermined groups of transform coefficients for estimating the value of a numerical processing parameter for quantizing said transform coefficients;

means for applying said estimate subsequently to said predetermined groups of transform coefficients which were used to estimate said numerical processing parameter; and wherein said means for estimating includes parameter estimator means having a plurality of bit calculating stages for estimating said numerical processing parameter which is to be applied to the same predetermined groups of transform coefficients.

9. The apparatus of claim 8 wherein the parameter estimator means includes:

calculating means for determining successive estimates of the processing parameter for the respective stages; and bit counter means in said stages for supplying to said calculating means the number of encoded bits which would be produced by a respective stage in response to the respective processing parameter estimate determined by the calculating means for that stage.

10. The apparatus of claim 9 including:

means for encoding said transform coefficients to provide said compressed data signal as a desired number of bits; and wherein said calculating means determines, for a final one of the stages, a final processing parameter which would cause said encoding means to produce said compressed data signal with substantially the desired number of bits.

11. The apparatus of claim 8 wherein said parameter estimator means includes:

first means for delaying said transform coefficients for a first time period during which the parameter estimator means estimates the processing parameter and supplies same to the means for applying.

12. The apparatus of claim 11 wherein the means for estimating further includes:
   second means for delaying said transform coefficients for a second time period prior to said first time period delay;
   means for bypassing a first portion of the transform coefficients around the second means for delaying; and
   calculating means responsive to said first portion of the transform coefficients for estimating an initial trial processing parameter for subsequent use by the calculating means when estimating said processing parameter which is to be applied to the predetermined groups of transform coefficients.

13. The apparatus of claim 12 wherein:
   said first means for delaying includes a delay in each of the plurality of bit calculating stages; and
   said second means for delaying includes a delay having a time delay substantially equal to the plurality of delays in the stages.

14. A method of preparing a digital signal for transmission as an encoded output signal formed of data blocks having a predetermined number of bits, comprising the steps of:
   transforming said digital signal to a spatial-frequency domain digital signal formatted in groups of transform coefficients of generally varying information content;
   selecting via a plurality of previous trial bit calculating steps, final quantizing parameters to be applied to the same said groups of transform coefficients, which final quantizing parameters, when applied to said groups of transform coefficients of generally varying information content, will provide substantially said predetermined number of bits in each of said data blocks;
   quantizing said groups of transform coefficients in response to said final quantizing parameters to generate integral values of groups of quantized coefficients having substantially the same information content; and
   encoding said quantized coefficients to produce said encoded output signal of data blocks, with said substantially predetermined number of bits in each data block.

15. The method of claim 14 wherein said step of selecting includes the steps of:
   delaying said transform coefficients a first time period;
   selecting a trial quantizing parameter during said first time period delay;
   determining if the number of encoded bits that would be produced by said encoding step in response to said trial quantizing parameter is substantially the same as said predetermined number of bits in each of said data blocks;
   applying said trial quantizing parameter for use as said final quantizing parameter if the number is substantially the same;
   estimating an updated trial quantizing parameter if the number is not the same; and
   repeating the steps of determining, applying and estimating until said number is substantially the same.

16. The method of claim 15 wherein the step of selecting a trial quantizing parameter further includes the steps of:
   selecting said trial quantizing parameter from an undelayed group of said transform coefficients prior to supplying all of the transform coefficients; and
   using the trial quantizing parameter derived from said undelayed group in said step of determining, for all the transform coefficients.

* * * * *